(12) United States Patent
Lee

(10) Patent No.: US 8,945,689 B2
(45) Date of Patent: Feb. 3, 2015

(54) HYDROTALCITE FOR P.V.C. STABILIZER AND A METHOD OF THEREOF

(75) Inventor: Dae Hee Lee, Cheongju (KR)

(73) Assignee: Dae Hee Lee, Cheongju (KR)

( * ) Notice: Subject to any disclaimer, the term of this patent is extended or adjusted under 35 U.S.C. 154(b) by 0 days.

(21) Appl. No.: 12/935,950

(22) PCT Filed: May 21, 2008

(86) PCT No.: PCT/KR2008/002818
§ 371 (c)(1),
(2), (4) Date: Dec. 20, 2010

(87) PCT Pub. No.: WO2009/123377
PCT Pub. Date: Oct. 8, 2009

(65) Prior Publication Data
US 2011/0095226 A1 Apr. 28, 2011

(30) Foreign Application Priority Data
Apr. 1, 2008 (KR) .................. 10-2008-0030310

(51) Int. Cl.
| C23C 14/22 | (2006.01) |
| C23C 14/18 | (2006.01) |
| C23C 14/48 | (2006.01) |
| C25D 5/54 | (2006.01) |
| C09K 3/00 | (2006.01) |
| H05H 1/24 | (2006.01) |
| C01F 7/00 | (2006.01) |
| C09C 1/40 | (2006.01) |

(52) U.S. Cl.
CPC ................. *C01F 7/002* (2013.01); *C01F 7/005* (2013.01); *C09C 1/40* (2013.01); *C01P 2002/22* (2013.01); *C01P 2002/85* (2013.01)
USPC ........... 427/576; 427/530; 205/159; 502/251; 252/182.29; 252/182.33; 252/182.35

(58) Field of Classification Search
None
See application file for complete search history.

(56) References Cited

U.S. PATENT DOCUMENTS

| 5,965,206 A * | 10/1999 | Hilti et al. .................. 427/393.1 |
| 6,140,403 A * | 10/2000 | Grossman ..................... 524/404 |
| 6,162,540 A * | 12/2000 | Tsuji et al. .................... 428/375 |
| 6,497,811 B1 * | 12/2002 | Myrstad et al. ............... 208/113 |
| 6,593,485 B1 * | 7/2003 | Stoll et al. ....................... 558/71 |
| 6,903,264 B2 * | 6/2005 | Watanabe et al. ............... 174/36 |
| 7,465,761 B2 * | 12/2008 | Murase et al. ................ 524/100 |
| 2010/0234511 A1 * | 9/2010 | Yamamoto et al. ........... 524/436 |

* cited by examiner

*Primary Examiner* — Joseph D Anthony
(74) *Attorney, Agent, or Firm* — Lowe Hauptman & Ham, LLP

(57) ABSTRACT

A method of preparing hydrotalcite for a PVC stabilizer, which comprises: forming crystals of hydrotalcite represented by a formula of M(II)XM(III)Y(OH)N(Am—)Z. nH2O, wherein M(II) is a divalent metal selected from Mg2+, Ni2+ and Zn2+; M(III) is a trivalent metal selected from Al3+, Fe3+, Cr3+ and Co3+; and Am— is an anion selected from CO32-, OH—, NO3-, SO42- and halides; and depositing zinc (Zn) onto the hydrotalcite by using any one method of electrode-position, chloride ion deposition, and plasma deposition to provide zinc-deposited hydrotalcite.

7 Claims, 2 Drawing Sheets

| Element | Weight % | Atom % | Formula | Compnd % |
|---|---|---|---|---|
| Mg K | 49.30 | 52.55 | Mg | 49.30 |
| Al K | 48.50 | 46.58 | Al | 48.50 |
| Zn K | 2.20 | 0.87 | Zn | 2.20 |
| Total | 100.00 | 100.00 | | 100.00 |

| Element | Weight % | Atom % | Formula | Compnd % |
|---|---|---|---|---|
| Mg K | 46.56 | 50.56 | Mg | 46.56 |
| Al K | 48.11 | 47.07 | Al | 48.11 |
| Ca K | 0.84 | 0.55 | Ca | 0.84 |
| Zn K | 4.49 | 1.81 | Zn | 4.49 |
| Total | 100.00 | 100.00 | | 100.00 |

HYDROTALCITE FOR P.V.C. STABILIZER AND A METHOD OF THEREOF

TECHNICAL FIELD

The present invention relates to a method of preparing a novel type hydrotalcite and use of the hydrotalcite obtained by the method as a stabilizer for PVC (polyvinyl chloride). More particularly, the present invention relates to a method of preparing a novel type hydrotalcite, which includes depositing zinc onto hydrotalcite by an ion exchange method, as well as to use of the hydrotalcite as a thermal stabilizer for PVC that provides excellent initial and medium-term heat resistance to PVC.

BACKGROUND ART

In general, PVC has bulky chlorine groups that are easily cleaved by external energy, such as heat or light. Upon the cleavage of chlorine, radicals are generated at the cleavage sites and immediately form double bonds. Such an increase in double bonds causes a change in color of PVC. As the temperature increases, double bond formation rapidly increases, so that PVC undergoes a change in color into a red color, and then into a black color.

Due to such weak heat resistance of PVC, processing and molding PVC are allowed only when a stabilizer reinforcing the heat resistance is added to PVC. As such stabilizers for PVC, metal soap stabilizers (e.g. Ca-stearate, Zn-stearate, Ba-stearate, Mg-stearate, etc.), tin (Sn)-based stabilizers, lead (Pb)-based stabilizers are widely used. Other wax and additives are also used in combination with inorganic fillers.

In the past, lead (Pb)-based, cadmium (Cd)-based or barium (Ba)-based stabilizers were frequently used for these purposes. However, use of non-toxic stabilizers prevails nowadays due to the harmful nature of heavy metals and environmental pollution problems. In general, calcium stearate and zinc stearate have been widely used as non-toxic stabilizers. They have been used in combination with a hydrotalcite-like compound, because they cannot provide sufficient heat resistance when used alone.

The hydrotalcite0like compound is a metallic compound having two or more metal double layers. Since the hydrotalcite captures anions in the interlayer, it shows an excellent ability of capturing free chlorine cleaved from PVC, and thus effectively inhibits degradation of the heat resistance of PVC caused by chlorine.

In addition, among the currently used metal soap-type stabilizers, zinc stearate is effective for initial heat resistance and calcium stearate is effective for long-term heat resistance. The zinc stearate stabilizer prevents initial coloration because zinc rapidly captures chlorine generated at the initial time. For these reasons, zinc oxide or hydroxide has been used in preparing hydrotalcite to provide a hydrotalcite-like compound wherein divalent zinc is added to the combination of magnesium/aluminum. However, in this case, zinc exists in a crystallized form as the base of the unique hydrotalcite double layer structure. Thus, the crystal structure is unstable and the particle size cannot be controlled with ease. Moreover, the hydrotalcite-like compound does not exist in an ionic structure capable of rapidly capturing chlorine, and is not effective for chlorine capture.

In general, hydrotalcite compounds have a structural formula represented by the following Formula (1):

$$M(II)XM(III)Y(OH)N(Am-)Z.nH2O \qquad (1)$$

Wherein M(II) is a divalent metal selected from $Mg2+$, $Ni2+$ and $Zn2+$; M(III) is a trivalent metal selected from $Al3+$, $Fe3+$, $Cr3+$ and $Co3+$; and Am- is an anion selected from $CO32-$, $OH-$, $NO3-$, $SO42-$ and halides. Since the hydrotalcite compounds represented by the above structural formula have a double layer structure, they are also called LDHs (layered double hydroxides) or MMLHs (mixed-metal layered hydroxides). Recently, the crystal structure has been modified at high temperature or under other conditions. The hydrotalcite compounds may also be utilized without crystallization water (wherein n=0).

In addition, materials like hydrotalcite have been prepared from various combinations of different metals. Those materials are hydrotalcite derivatives and also called hydrotalcite-like minerals. However, the hydrotalcite-like minerals provided with excellent capturing ability still have a disadvantage in that they cannot provide sufficient initial coloration resistance and medium- and long-term heat resistance when used as stabilizers for PVC. Under these circumstances, there has been an imminent need for a novel type hydrotalcite compound capable of providing excellent initial coloration resistance and medium- and long-term heat resistance.

DISCLOSURE OF INVENTION

Technical Problem

The present invention has been made to solve the above problem occurring in the prior art, and an object of the present invention is to provide hydrotalcite obtained by ion deposition of metal ions having excellent initial coloration resistance and medium-term heat resistance onto hydrotalcite, so that the resultant hydrotalcite provides improved initial coloration resistance and medium-term heat resistance when used as a thermal stabilizer for PVC.

In other words, an object of the present invention is to provide a method of preparing hydrotalcite for a stabilizer for PVC, which includes carrying out ion deposition of zinc ions onto hydrotalcite to provide improved initial coloration resistance and medium-term heat resistance while maintaining other properties of hydrotalcite.

In addition, another object of the present invention is to provide the use of the hydrotalcite in improving initial and medium-term heat resistance of various types of PVC resins.

Technical Solution

The foregoing and and/or other aspects of the present invention are achieved by providing a method of preparing hydrotalcite, including forming hydrotalcite crystals and depositing zinc onto the hydrotalcite crystals, and the use of the hydrotalcite. The hydrotalcite shows excellent initial coloration resistance and medium-term heat resistance when used as a PVC stabilizer.

Methods of forming hydrotalcite crystals that may be used herein include methods using a water soluble metal salt and methods using a metal oxide or hydroxide. Particularly, hydrotalcite may be prepared by adding a basic substance to mixed metal components dissolved in an aqueous solution, thereby causing co-precipitation of the mixed metal components as hydroxides to provide mixed metal compounds, which, in turn, are subjected to hydrothermal treatment. Otherwise, hydrotalcite may be prepared by direct hydrothermal treatment under high pressure.

In addition, the methods of forming hydrotalcite crystals by using a water soluble metal salt include methods starting with MgCl2 or AlCl3, methods starting with nitrate, such as Mg(NO3)2 or Al(NO3)3, and methods starting with sulfate, such as MgSO4 or Al2(SO4)3, or the like. Meanwhile, the methods of forming hydrotalcite crystals by using a metal oxide or metal hydroxide include methods starting with MgO, Al2O3, Mg(OH)2, Al(OH)3, etc.

After forming a double layer structure of hydrotalcite through any one of the above-mentioned methods of forming hydrotalcite crystals, zinc or calcium is deposited onto the hydrotalcite crystals according to one embodiment of the present invention, so that the resultant hydrotalcite provides improved initial coloration resistance and long-term heat resistance when used as a stabilizer for PVC.

Methods of deposing zinc onto the hydrotalcite crystals prepared as described above include deposition using a water soluble zinc salt, electrodeposition, and plasma deposition. Although any one of the above deposition methods may be used in the present invention, the electrodeposition method is the most effective and efficient in view of the above object.

According to one embodiment of the present invention, zinc ions are deposited onto hydrotalcite obtained from various methods so that the resultant hydrotalcite is used as a thermal stabilizer for PVC. The resultant hydrotalcite has a structure represented by the formula of M(II)XM(III)Y(OH)N(Am-)Z.nH2O, wherein M(II) is a divalent metal selected from Mg2+, Ni2+ and Zn2+; M(III) is a trivalent metal selected from Al3+, Fe3+, Cr3+ and Co3+; and Am- is an anion selected from CO32-, OH-, NO3-, SO42- and halides. The starting hydrotalcite that may be used herein includes hydrotalcite or derivatives thereof obtained by any methods besides the methods using a metal oxide or hydroxide and methods using a metal chloride. The starting hydrotalcite may have a broad range of particle sizes, for example, a particle size ranging from 0.01 μm to 100 μm.

Then, the starting hydrotalcite is dispersed into water or other organic solvents and zinc is deposited thereon via electrodeposition. In other words, the starting hydrotalcite is dispersed into water or other organic solvents in an amount of 1-100 wt % (suitably 20-50 wt %) based on the weight of the solution, and then zinc is connected to a cathode and an anode in an electrolysis system through which electric current flows. In this manner, zinc ions are stably deposited on the interlayer of the double layer structure of hydrotalcite or on the porous surface thereof. At that time, the voltage for electrolysis is generally supplied from a variable current power supply (0-200V) capable of controlling the voltage depending on the ionization amount of zinc. The zinc used herein is a zinc plate or zinc wire with a high purity of at least 99.9%.

To perform the deposition stably in an aqueous solution or organic solution, one approach includes dispersing only the hydrotalcite into the aqueous solution or organic solution, and supplying electric current thereto to carry out adsorption or deposition of zinc. Another approach includes dispersing a predetermined amount (0.01-50 wt %, suitably 0.5-15 wt %) of organic substances such as various kinds of acids, alcohols or surfactants are dispersed, alone or in combination, into the solution together with hydrotalcite, and then depositing zinc ions in an electrolysis system. Herein, to induce effective zinc deposition, an adequate degree of agitation (5-300 rpm) may be applied while dispersing the hydrotalcite, or the aqueous solution or organic solution may be heated (up to 100° C.) by using a heating plate during the electrolysis.

Advantageous Effects

As described above, the present invention can provide hydrotalcite that may be used as an effective thermal stabilizer for PVC. The hydrotalcite disclosed herein has chlorine capturing ability derived from hydrotalcite itself in combination with chlorine capturing ability derived from zinc, and thus provides improved initial coloration resistance and medium-term heat resistance to PVC.

According to the present invention, zinc ions having initial coloration resistance are deposited onto the surface of hydrotalcite via electrodeposition while not modifying the chlorine capture structure unique to the double layer structure of hydrotalcite. Therefore, hydrotalcite can be converted into an effective thermal stabilizer for PVC simply by adding an electroplating device to an existing hydrotalcite production line with no significant increase in the cost required for equipment.

In addition, according to the present invention, zinc deposition onto hydrotalcite, a double layer-type metal hydroxide compound widely used in various industrial fields, can improve the quality of hydrotalcite as a stabilizer for PVC. Further, the hydrotalcite according to one embodiment of the present invention can be used in other industrial fields, including fibers, cosmetics, household electronic appliances, living goods, or the like to impart various functionalities thereto.

BEST MODE FOR CARRYING OUT THE INVENTION

Figure 1:
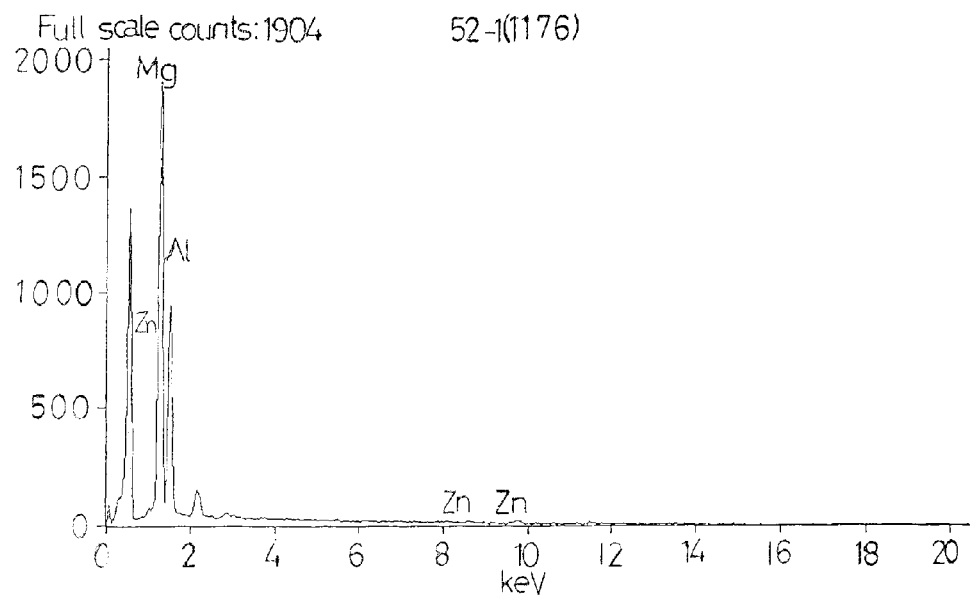
FIG. 1 shows the EDS (Energy Dispersive X-ray Spectroscopy) result of Sample 1.
Figure 2:
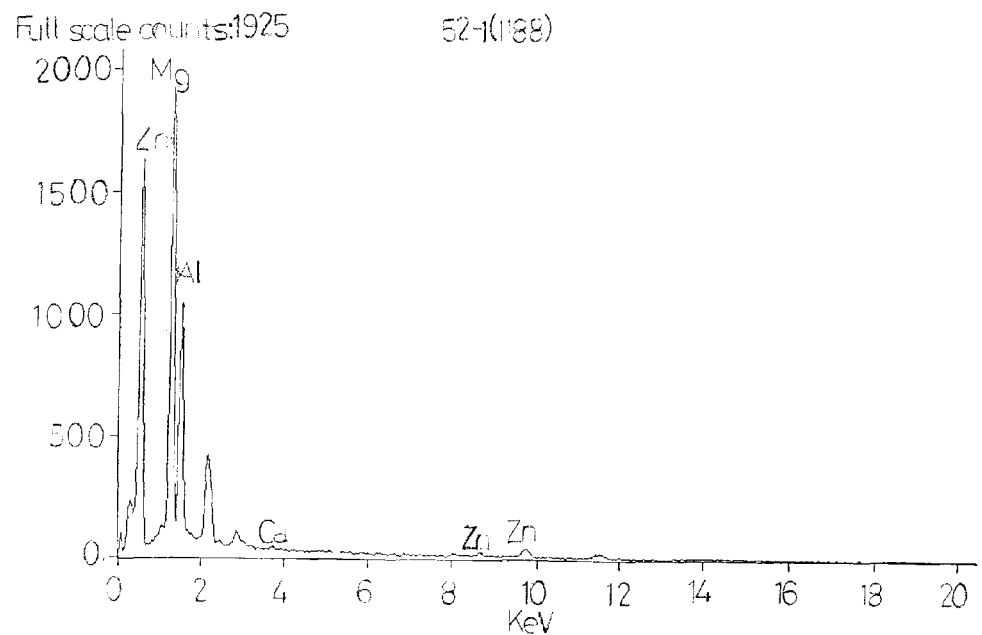
FIG. 2 shows the EDS result of Sample 2.

Exemplary embodiments of the present invention now will be described more fully hereinafter. The present invention may, however, be embodied in many different forms and should not be construed as limited to the exemplary embodiments set forth herein.

EXAMPLE 1

As mentioned above, hydrotalcite may be obtained by various methods. In this example, hydrotalcite is obtained by a method using a metal hydroxide. First, 1.7 L of distilled water is introduced to a 3 L stainless steel autoclave. Next, 100 g of Mg(OH)2 (95%) and 71.30 g of NaHCO3 (99.5%) are added thereto, followed by agitation, and 64 g of Al(OH)3 (58%) is further added thereto. Then, the resultant mixture is heated to 180° C. with agitation under 500 rpm and is further agitated for 3 hours. After the completion of the agitation, the reaction mixture is depressurized, filtered and washed with water to obtain hydrotalcite crystals.

Next, 4 g of hydrotalcite is taken from the hydrotalcite crystals thus obtained and dispersed into 300 mL of distilled water. Then, a zinc plate having a dimension of 2×1 cm and a weight of 1.1 g and including zinc with a purity of 99.99% is connected to a cathode and an anode at an interval of 5 mm. While maintaining water temperature at 25° C., a teflon coated stirrer is mounted to the electrolysis system. Then, an electric current with a voltage difference of 30V is applied to the electrolysis system for 4 hours by using a power supply, while carrying out agitation under 500 rpm, thereby performing deposition of zinc ions onto the hydrotalcite.

After the lapse of 4 hours, the electric current is interrupted and the hydrotalcite sample is filtered and dried in an oven at 105° C. for 10 hours to provide Sample 1. After analyzing Sample 1 by EDS, it can be seen that 2.20% of zinc is deposited onto the hydrotalcite. Then, Sample 1 is coated with 2.5% stearic acid and blended with PVC according to the formulation as shown in the following Table 1.

The resultant blend is kneaded in a roll mill at 185° C. for 5 minutes to provide a sheet of Sample 1 with a uniform thickness. The sheet of Sample 1 is cut into pieces with the same size, which, in turn, are introduced into an oven at 200° C. After that, the pieces of the sheet of Sample 1 are withdrawn from the oven one by one at 10 minute intervals to determine the degree of discoloration.

EXAMPLE 2

First, 4 g of hydrotalcite is taken from the hydrotalcite crystals obtained in the same manner as described in Example 1, and then is dispersed into 300 mL of distilled water. Then, a zinc plate having a dimension of 2×1 cm and a weight of 1.1 g and including zinc (containing a small amount of calcium) with a purity of at least 99.5% is connected to a cathode and an anode at an interval of 5 mm. While maintaining water temperature at 60° C., a teflon coated stirrer is mounted to the electrolysis system. Then, an electric current with a voltage difference of 30V is applied to the electrolysis system for 4 hours by using a power supply, while carrying out agitation under 500 rpm, thereby performing deposition of zinc ions onto the hydrotalcite.

After that, the electric current is interrupted and the hydrotalcite sample is filtered and dried in an oven at 105° C. for 10 hours to provide Sample 2. After analyzing Sample 2 by EDS, it can be seen that 4.49% of zinc ions and 0.84% of calcium ions are deposited onto the hydrotalcite. Then, Sample 2 is coated with 2.5% stearic acid and blended with PVC according to the formulation as shown in the following Table 1.

The resultant blend is kneaded in a roll mill at 185° C. for 5 minutes to provide a sheet of Sample 2 with a uniform thickness. The sheet of Sample 2 is cut into pieces with the same size, which, in turn, are introduced into an oven at 200° C. After that, the pieces of the sheet of Sample 2 are withdrawn from the oven one by one at 10 minute intervals to determine the degree of discoloration.

Comparative Example 1

A commercially available hydrotalcite containing zinc in its structure (Polylizer 121 available from Doobon, Co., moisture content 0.5%, particle size 0.2-0.5 μm, MgO/Al2O3 molar ratio=2.8-3.2, ZnO/Al2O3 molar ratio=0.8-1.2, pH=8.6, bulk density=0.3-0.5 g/ml, coated with 2.5% stearic acid) is blended with PVC according to the formulation as shown in the following Table 1.

The resultant blend is kneaded in a roll mill at 185° C. for 5 minutes to provide a sheet with a uniform thickness. The sheet is cut into pieces with the same size, which, in turn, are introduced into an oven at 200° C. After that, the pieces of the sheet are withdrawn from the oven one by one at 10 minute intervals to determine the degree of discoloration.

Comparative Example 2

The hydrotalcite obtained from Example 1 is dried without depositing zinc ions thereon (moisture content 2.5%, particle size 0.2-0.5 μm, MgO/Al2O3 molar ratio 2.8-3.2, pH=8.6, bulk density=0.4-0.5 g/ml). Then, the hydrotalcite is coated with 2.5% stearic acid, and blended with PVC according to the formulation as shown in the following Table 1.

The resultant blend is kneaded in a roll mill at 185° C. for 5 minutes to provide a sheet with a uniform thickness. The sheet is cut into pieces with the same size, which, in turn, are introduced into an oven at 200° C. After that, the pieces of the sheet are withdrawn from the oven one by one at 10 minute intervals to determine the degree of discoloration.

TABLE 1

| Material | Ex. 1 | Ex. 2 | Comp. Ex. 1 | Comp. Ex. 2 |
|---|---|---|---|---|
| PVC(P-1000) | 100.0 | 100.0 | 100.0 | 100.0 |
| Dioctyl Phthalate | 30.0 | 30.0 | 30.0 | 30.0 |
| Zinc Stearate | 0.20 | 0.20 | 0.20 | 0.20 |
| Calcium Stearate | 0.05 | 0.05 | 0.05 | 0.05 |
| CaCO$_3$ | 20.0 | 20.0 | 20.0 | 20.0 |
| Hydrotalcite | 2.00 | 2.00 | 2.00 | 2.00 |

TABLE 2

PVC Heat Resistance Test

| Time (min) | Ex. 1 | Ex. 2 | Comp. Ex. 1 | Comp. Ex. 2 |
|---|---|---|---|---|
| 0 | ◎ | ◎ | ◎ | ◎ |
| 10 | ◎ | ◎ | ◎ | ◎ |
| 20 | ◎ | ◎ | ◎ | ◎ |
| 30 | ○ | ○ | Δ | Δ |
| 40 | Δ | Δ | Δ | Δ |
| 50 | Δ | Δ | ▲ | ▲ |
| 60 | ▲ | ▲ | X | X |

◎: white,
○: beige,
Δ: yellow,
▲: dark yellow,
X: brown

Although few embodiments of the present invention have been shown and described, it would be appreciated by those skilled in the art that changes may be made in these embodiments without departing from the principles and sprit of the invention, the scope of which is defined in the claims and their equivalents.

The invention claimed is:

1. A method of preparing hydrotalcite for a PVC stabilizer, comprising:
   forming crystals of hydrotalcite represented by a formula of:

$$Mg_4Al_2(OH)_{12}CO_3 \cdot 3H_2O,$$

and
   depositing zinc (Zn) onto the hydrotalcite using any one of electrodeposition, chloride ion deposition, or plasma deposition to provide zinc-deposited hydrotalcite.

2. The method of preparing hydrotalcite as claimed in claim 1, further comprising:
   depositing the zinc in combination with calcium using any one of electrodeposition, chloride ion deposition or plasma deposition after forming the crystals of hydrotalcite to reinforce long-term heat characteristics.

3. The method of preparing hydrotalcite as claimed in claim 1, further comprising:
   depositing the zinc onto the hydrotalcite via electrodeposition of zinc alone or in combination with other metals by connecting zinc with a high purity of at least 99.9% to either or both of a cathode or an anode, and
   carrying out the electrodeposition under a voltage of 1-100V; and
   providing a zinc deposition amount of 0.001-30 wt %.

4. The method of preparing hydrotalcite as claimed in claim 1, further comprising:
  depositing the zinc onto the hydrotalcite via electrodeposition of zinc alone or in combination with other metals by connecting zinc with a high purity of at least 99.9% to either or both of a cathode and an anode so that zinc ions are deposited onto the hydrotalcite, and
  carrying out the electrodeposition under a voltage of 1-100V; and
  providing a zinc deposition amount of 1-10 wt%.

5. The method of preparing hydrotalcite as claimed in claim 1, wherein forming the crystals of hydrotalcite comprises:
  filtering, drying and dewatering the zinc-deposited hydrotalcite.

6. The method of preparing hydrotalcite as claimed in claim 1, wherein the zinc-deposited hydrotalcite includes zinc-deposited hydrotalcite coated with about 0.01-10.0%, of a fatty acid, alcohol, metal soap, wax or polymer via dry coating, wet coating or mechanical coating.

7. The method of preparing hydrotalcite as claimed in claim 1, wherein forming the crystals of hydrotalcite comprises:
  heat treating the hydrotalcite at a temperature of 200° C. or higher.

\* \* \* \* \*